UNITED STATES PATENT OFFICE.

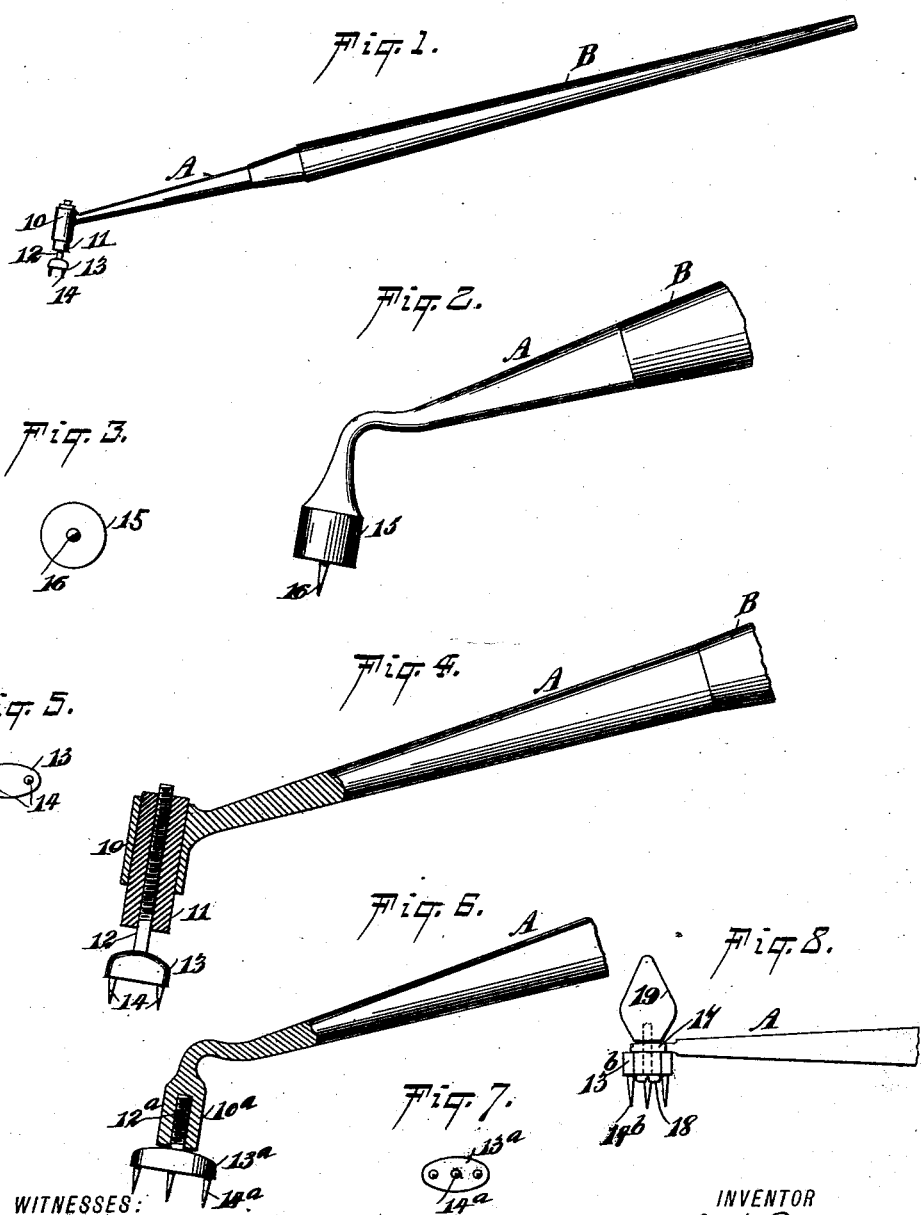
(No Model.)
J. W. DENNIS.
DENTAL TOOL AND PLUGGER.
No. 569,093. Patented Oct. 6, 1896.

JAMES W. DENNIS, OF CINCINNATI, OHIO, ASSIGNOR TO CLARA E. DENNIS, OF SAME PLACE.

DENTAL TOOL AND PLUGGER.

SPECIFICATION forming part of Letters Patent No. 569,093, dated October 6, 1896.

Application filed January 6, 1896. Serial No. 574,611. (No model.)

*To all whom it may concern:*

Be it known that I, JAMES W. DENNIS, of Cincinnati, in the county of Hamilton and State of Ohio, have invented a new and useful Improvement in Dental Tools, of which the following is a full, clear, and exact description.

My invention relates to an improvement in dental tools, and the object of the invention is to provide an instrument especially adapted for taking up and holding pads or plugs adapted to be introduced into cavities in the teeth, and especially pads or plugs of a character enabling them to absorb surplus mercury from amalgam fillings, the tools being so constructed that the plugs or pads may be safely, conveniently, and expeditiously located in a cavity in a tooth and released when in said cavity without causing pain during the operation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved dental tool. Fig. 2 is a partial side elevation of a slightly-modified form of the same. Fig. 3 is a bottom plan view of the head or receiving surface of the tool shown in Fig. 2. Fig. 4 is an enlarged vertical section through the tool shown in Fig. 1. Fig. 5 is a bottom plan view of the head of the dental tool illustrated in Fig. 4. Fig. 6 is a further modified form of the dental tool, a portion thereof being in section. Fig. 7 is a bottom plan view of the head of the tool shown in Fig. 6, and Fig. 8 is a side elevation of another modified form of the tool.

In carrying out the invention, the preferred form of dental tool shown in Figs. 1, 4, and 5 comprises primarily a shank A and a handle B, the shank being made to terminate at its outer end in a sleeve 10, in which sleeve a nut 11 is located, being preferably held therein by frictional contact, and the interior threaded surface of the nut is adapted to receive a screw 12, which is secured to a head or head-block 13, and the said head or head-block is provided with one or a number of spurs 14 upon its under face, adapted to enter into the plugs or pads, thus enabling the same to be carried to the cavity of the tooth being operated upon; and by reason of the screw 12 the head 13 may be turned so as to be most conveniently presented to the cavity and may be adjusted to and from its support. The head is preferably of oval formation, as shown in Fig. 5, although it may have other shape, if desired.

In the form of the dental tool shown in Fig. 2 the head 15 is integral with the said shank and is at an angle thereto, and the said head is shown as circular in bottom plan view and is provided with a single central spur 16.

In Fig. 6 the shank A is provided with a sleeve or socket $10^a$, integral with the shank and at an angle thereto, and the bore of the sleeve or interior diameter of the socket is threaded to receive the screw $12^a$, fastened to or integral with the head $13^a$, (shown as oval in the drawings,) and, furthermore, is provided with three or more spurs $14^a$. The formation of the head of this improved dental tool and the number of the spurs carried thereby may be changed to suit the formation of the plugs to be placed in a tooth-cavity.

In Fig. 8 the shank A is made to terminate at its outer end in a socket 17, and the head-block $13^b$, provided with prongs $14^b$ upon its under face, is secured in the aforesaid socket 17 by means of a screw 18 or its equivalent, and this screw likewise serves to secure upon the opposite face of the socket 17 a plugging-head 19, which is preferably conical at its outer end, and is adapted for beating the filling into the cavity of a tooth after the said filling has been introduced by the spurs $14^b$. Under this construction a tool is provided capable of not only taking up a filling for the purpose of transferring it to a cavity, but by simply turning the tool after the filling is in place in the cavity the head 19 may be brought into action to compress the said filling, thus economizing in time, since one tool will not have to be dropped and another taken up for the purpose of applying the filling and then setting it in position.

Having thus described my invention, I claim as new and desire to secure by Letters Patent—

1. In a dental tool, the combination with a handle and a socket carried thereby, of a pin-carrying head adjustably connected with the said socket, as and for the purpose set forth.

2. In a dental tool, a shank, a sleeve connected with the shank at an angle thereto, a nut carried by the said sleeve, and a pin-carrying head adjustable in the said nut, as and for the purpose set forth.

3. A dental tool, comprising a handle provided with a socket, a pin-carrying head, and a screw for connecting the pin-carrying head with the socket of the handle, as and for the purpose specified.

4. In a dental tool, the combination with a handle provided with a socket, of a pin-carrying head, a screw for connecting the pin-carrying head with the socket of the handle, and a plugging-head secured upon the end of the screw, as and for the purpose set forth.

JAMES W. DENNIS.

Witnesses:
LOUIS A. BROWNBECK,
J. D. MEEKER.